Sept. 28, 1965 W. G. A. SCHULZE 3,208,834
METHOD AND APPARATUS FOR CRYSTALLIZING
AND CLASSIFYING
Filed Jan. 26, 1960 4 Sheets-Sheet 1

Fig. 1.

INVENTOR.
WILLIAM G. A. SCHULZE
BY
James E. Tooney
ATTORNEY

United States Patent Office 3,208,834
Patented Sept. 28, 1965

3,208,834
METHOD AND APPARATUS FOR CRYSTALLIZING AND CLASSIFYING
William G. A. Schulze, Ontario, Calif.; Hertha M. Schulze, executrix of said William G. Schulze, deceased
Filed Jan. 26, 1960, Ser. No. 4,722
13 Claims. (Cl. 23—302)

This application is a continuation-in-part of my application Serial No. 769,129, filed October 23, 1958 and now abandoned.

This invention relates to a method and apparatus for crystallizing and classifying crystals from a supersaturated solution. More particularly it is concerned with providing a novel method and apparatus for inducing and controlling crystal growth and classifying crystals in saturated or supersaturated salt solutions. In an advantageous embodiment of the invention, the method and apparatus to be described hereinafter can be used to produce fast efficient crystal growth and uniform crystal classification of coarse diammonium phosphate crystals from a diammonium phosphate solution.

Conventional crystallization procedures involve obtaining a solution of the substance to be crystallized from a source of supply. The solution is usually passed through an evaporator, maintained under reduced atmospheric pressure, for the purpose of supersaturating the solution, which is then introduced into a crystallizing chamber wherein crystals of the material are allowed to grow. The supersaturated solution is usually circulated within the crystallizing chamber and/or recirculated to the evaporator until coarser crystals are grown and removed. The solution is recirculated to the evaporator for concentration to supersaturation and fresh amounts of feed solution are added. In some arrangements, feed solution is added to the crystallizing chamber before recirculation to the evaporator. Finer size crystals are usually recirculated to the evaporator with the solution allowing them to grow in size. Examples of crystallizing systems and processes embodying the above arrangements are shown in the United States patents of Saeman Numbers 2,567,968 and 2,737,451, Otto No. 2,424,207, Frejacques No. 2,819,154, Ayres No. 2,671,716 and Tiddy No. 2,368,901.

While the above systems are satisfactory for some purposes, there is a need for a more efficient, continuous system of crystallization to produce more uniform crystals of relatively larger and coarser size. Due to turbulence developed in the crystallizers in some of the above-mentioned systems, smaller size crystals are undesirably drawn in with the large size crystals as they are removed from the system.

According to my invention, there is provided an improved simplified apparatus and method for producing more uniform size crystals of relatively coarser and larger size from a solution containing the material.

Various objects and advantages of the instant invention will become apparent to one skilled in the art from the following discussion and disclosure.

In accordance with the present invention, a continuous method and apparatus is provided for producing relatively coarse uniform size crystals which comprises obtaining a saturated slurry liquid containing relatively smaller size crystals of the substance. The slurry liquor with crystals in suspension is introduced into a vacuum evaporator or evaporation zone where, by evaporative cooling, a low degree of supersaturation in the metastable region is obtained. The supersaturation is advantageously kept constant at a point low enough that the formation of additional seed crystals is reduced to a minimum or retarded while the original crystals grow in size. Control of supersaturation in the metastable region which favors the above mentioned crystal growth instead of seed crystal formation is achieved by the conventional methods of proper adjustment of vacuum, flow rate and temperatures plus the additional novel step of introducing a moderate amount of an aqueous fluid, preferably of low pressure wet steam or hot water or both, through a diffusing nozzle or small pipe connection into the original slurry liquor stream containing primary crystals in suspension. The supersaturated slurry liquor containing various size crystals including coarse, medium, and fine size crystals is withdrawn from the evaporator and is continuously introduced as a stream into a novel crystallizing and classifying vessel or zone containing a conical bottom portion. The slurry stream enters substantially horizontally into the lower portion of the vessel and is directed towards an inclined baffle member located within the vessel and adjacent to the slurry stream inlet. The relatively coarser, heavier crystals settle from the slurry stream ad pass below the baffle to the conical bottom of the vessel. The slurry stream and the relatively smaller size crystals suspended therein are deflected upwardly towards an overflow outlet located at the top of the vessel and opposite from the slurry stream inlet.

The disposition of the baffle member, conical bottom of the vessel, and overflow outlet with respect to each other, the overflow outlet being on the opposite side of the solution stream inlet, creates two substantially vertical flow zones within the vessel. In one zone the deflected solution stream and suspended smaller size crystals are travelling or moving upwardly towards the overflow outlet during which time the relatively smaller size crystals grow, become heavier, slow down and descend into a second zone wherein the crystals continue to grow during their downward movement and pass behind the baffle into the conical bottom of the vessel.

If desired the second zone can be beneficially maintained by introducing mother liquid near the bottom of the vessel opposite from the slurry stream inlet to give a gentle upward movement of the solution in the second zone which retards the downward movement of the crystals. The grown, relatively coarse, uniform size and mature crystals can in the meantime be withdrawn to a slurry settling vessel, and then passed to a dryer. The mother liquor overflowing from the crystallizing and classifying vessel is eventually replenished with saturated slurry liquor from a source.

In a further advantageous embodiment of the invention it has been found that by introducing a predetermined amount preferably of low pressure steam or hot water or both into the original slurry stream passing to the evaporator many seed crystals, which are together with the primary small crystals in suspension, are dissolved. This reduces the total amount of crystals in suspension somewhat but allows the remaining substantial portion of crystals to grow larger after supersaturation of the solution in the metastable region has taken place. The amount of low pressure steam necessary is usually one fifth or less of the evaporating capacity of the atmospheric condenser in pounds per hour.

In one advantageous embodiment of the invention one or more outlets are disposed at a suitable distance above the bottom of the cone of the classifying and crystallizing vessel and in a location opposite to the slurry inlet but below the top of the inclined baffle member. These outlets are arranged vertically one above the other and lead to a by-pass line. This line has a flow control valve and is connected to the inlet of the circulation pump which pumps the original slurry containing the primary crystals to the evaporator. While the grown, relatively coarse, uniform size and mature crystals pass to the bottom of the cone and are withdrawn as a thickened slurry for final treatment, somewhat smaller, medium to large size crystals pass with a moderate amount of slurry liquor through one of the outlets by way of the by-pass line to the inlet of the circulation pump. Here the medium to large size crystals blend into the stream of the original slurry liquor containing primary crystals in suspension. Growth of the recirculated crystals to the desired mature size is effected when the slurry liquor becomes supersaturated in the evaporator.

To produce extra large crystals the flow control valve in the by-pass line can be opened wide. This will accelerate the flow and allow the medium to large size crystals to make more than one pass through the evaporator system to get extra growth before they pass to the bottom outlet of the cone where they are withdrawn as a thickened slurry from the system for final treatment. This final treatment can involve introducing the withdrawn slurry into a slurry settling vessel to obtain a further thickening of the slurry from the settling vessel to dryers.

Use of a particular by-pass outlet will depend on the scope of operation. For continuous full capacity operation the lowest outlet is usually chosen to prevent too many crystals from building up in the cone in a short time. For slow operation it may be desirable to let a certain amount of build up of crystals to take place in the bottom and to remove them batchwise. Then a higher by-pass outlet should be chosen to retain more crystals in the bottom of the vessel. In any event the highest by-pass outlet should be at a height below the opening under the inclined baffle so that the crystals cannot build up to the baffle and plug the opening below it.

The invention will be more fully understood from the following description when considered in connection with the accompanying drawings which show exemplary apparatus embodying the principles of the invention and in which the novel process may be carried out.

While the present invention is applicable to crystallization of substances generally, it will be described as exemplary, with particular reference to diammonium phosphate crystals. Other materials or substances which may be crystallized, for example, include ammonium sulfate, potassium sulfate, sodium chloride, ammonium nitrate, etc.

Figure 1:
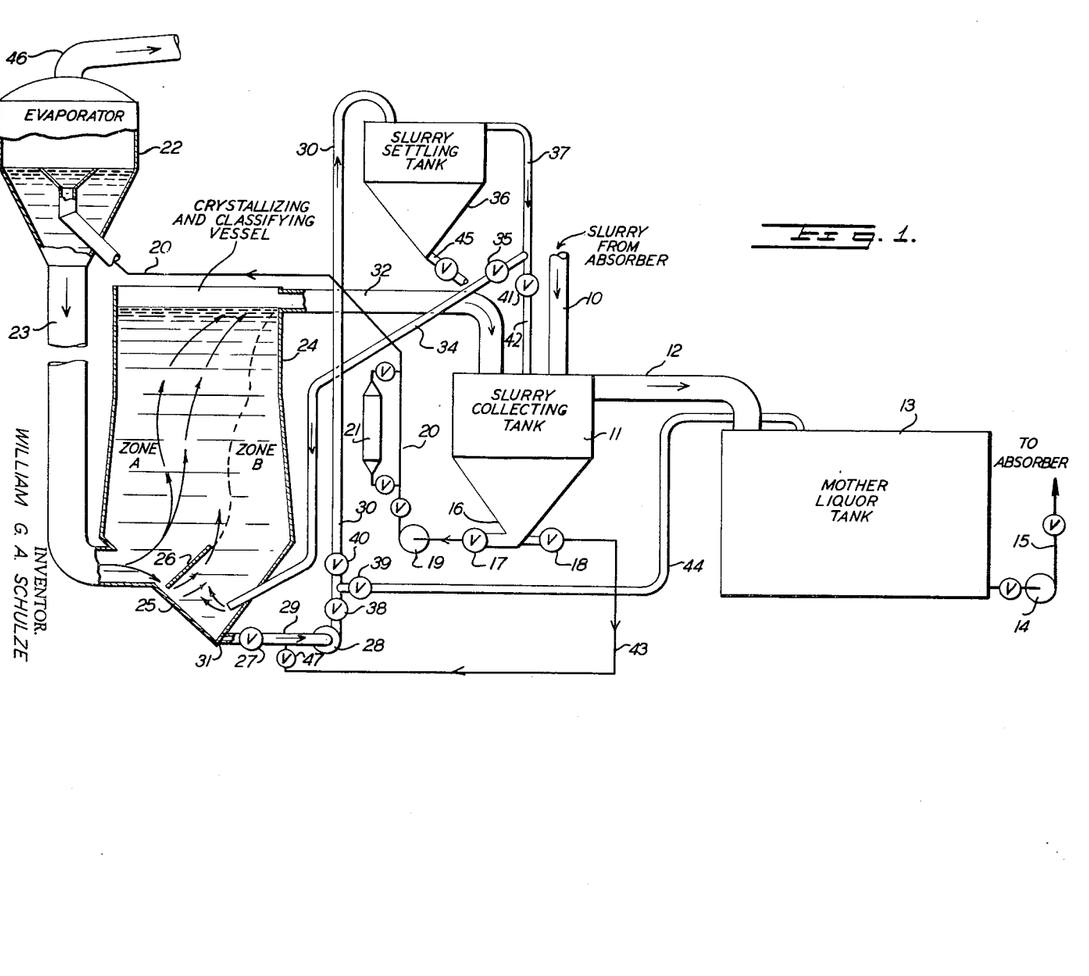
FIGURE 1 is a drawing indicating the various steps in the operation of the process and one form of apparatus used to carry out the process.

Referring now to FIGURE 1, a saturated acid slurry liquor which contains diammonium phosphate crystals of predominantly smaller sizes in suspension and diammonium phosphate in solution is obtained from a suitable source such as a spray type ammonia absorber unit (not shown) where such crystals have been formed in a saturated solution by intimate contact of acid liquor and ammonia from coke oven gases.

The slurry liquor is introduced through line 10 and collects in a slurry-collecting tank 11 which contains a conical bottom and which is in communication with a mother liquor tank 13 through overflow line 12. Clear liquor from the slurry tank 11 overflows through line 12 to the mother liquor tank 13 and is subsequently withdrawn from the mother liquor tank through valved line 15 by means of pump 14 and returned, for example, to the ammonia absorber unit for further processing. A slurry of diammonium phosphate crystals collects at the bottom 16 of tank 11 and is withdrawn through line 20, containing valve 17, by means of a variable speed slurry circulating pump 19. Slurry-collecting tank 11 is also in communication with classifying and crystallizing vessel 24 through overflow line 32 which returns overflow liquor from vessel 24 to the slurry-collecting tank 11. Slurry-collecting tank 11 also contains outlet line 43 containing normally closed valves 18 and 47 which will be described more fully hereinafter.

The slurry removed from tank 11 through line 20 may be, if desired, passed through a heater 21 before introduction into vacuum evaporator 22 for the purpose of achieving a better control of temperatures and optimum operating conditions. Suitable valves are provided for this purpose. In evaporator 22, the slurry liquor is concentrated by conventional means to supersaturation and withdrawn through downleg 23. Water vapor is removed from the evaporator 22 via line 46 which is connected to a conventional barometric condenser (not shown).

The supersaturated slurry liquor containing unclassified crystals is introduced into crystallizing and classifying vessel 24 from downleg 23. Vessel 24 comprises a conical bottom 25. Although a conical bottom is shown, it is manifest that configurations having converging wall portions aside from conical arrangements can be used. For example, a pyramidal shape may be used for the bottom.

Figure 2:
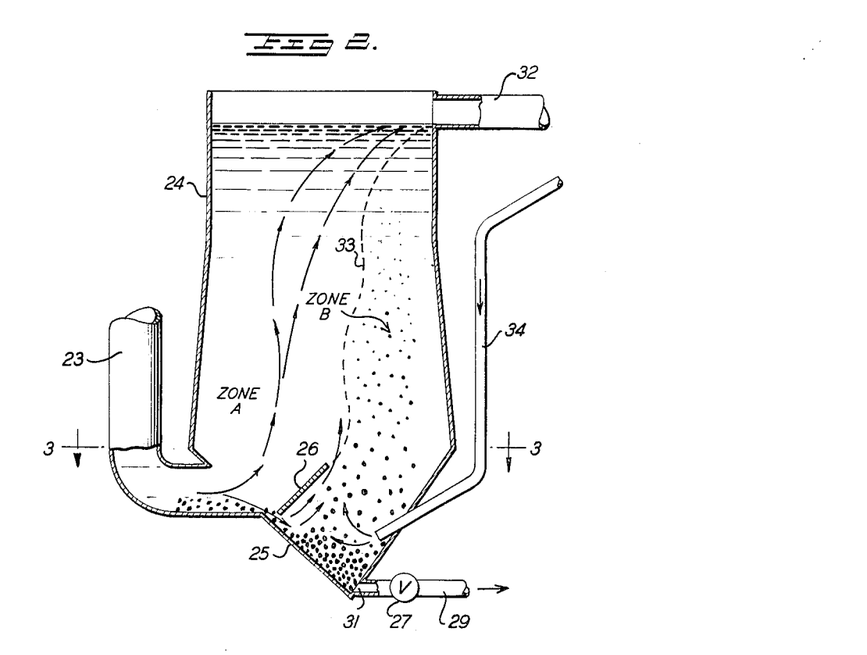
FIGURE 2 is an enlarged vertical section through the novel classifying and crystallizing vessel shown in FIGURE 1.
Figure 3:
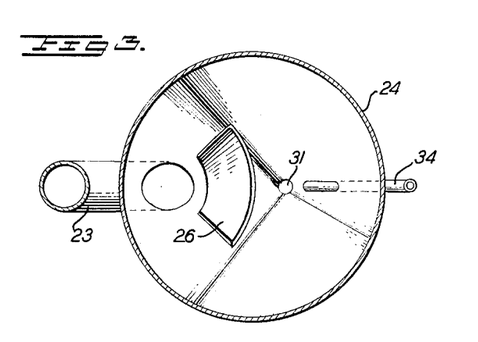
FIGURE 3 is a top sectional view of the vessel taken through line 3—3 of FIGURE 2.

The downleg 23 is connected to the upper portion of the conical bottom 25 of the vessel 24. The supersaturated slurry liquor enters vessel 24 as a substantially horizontal stream and is diverted or deflected upwardly as shown by the arrows in FIGURE 2 by an inclined deflector or baffle plate 26. Baffle plate 26 is positioned within the tank 24 adjacent to the downleg inlet to divert the supersaturated slurry liquor stream upwardly towards the overflow liquor line 32 located on the opposite side of vessel 24. The baffle plate may be curved in configuration as shown in FIGURE 3, or it may comprise a flat rectangular surface. The curved configuration is preferred, since the liquor stream is controlled better as it is deflected towards the overflow outlet line 32.

A curved surface, such as a segment of a cone provides a smooth upward flow. The deflector or baffle plate 26 is supported by suitable brackets (not shown) within the vessel. The baffle plate 26 does not directly contact the inner surfaces of the walls of the vessel and thereby undesired accumulation of crystals is prevented from taking place.

Crystals of diammonium phosphate contained within the entering supersaturated slurry liquor stream are classified by this operation. The relatively coarser and heavier crystals as shown in FIGURE 2 descend and pass beneath the deflector plate 26, flowing down the conical surface of the bottom portion of the tank until they accumulate at the bottom and are withdrawn through outlet 31 into slurry outlet line 29 containing slurry pump 28 and valve 27. The minor amount of liquor passing below baffle plate 26 gently agitates the settling crystals behind the baffle plate 26 to keep them from packing and plugging the outlet 31 to line 29 and pump 28. The relatively smaller crystals of diammonium phosphate contained in the entering liquor stream being lighter are carried along with the supersaturated liquor stream and are diverted upwardly towards the overflow liquor outlet line 32.

It is to be noted that the upwardly diverted liquor stream, the configuration of the vessel bottom 25 and the overflow liquor outlet line 32, positioned at the opposite end of the vessel with respect to the liquor stream inlet, create two zones, A and B, within the vessel having an approximate merging line between the deflector plate 26 and overflow liquor outlet line 32 as indicated by the dash line 33 in FIGURE 2. The two zones comprise two moving suspensions of crystals of diammonium phosphate. In zone A, relatively smaller crystals, comprising fine and medium sizes, are moving in an upwardly direction, while in zone B, a suspension of growing relatively coarser and larger crystals is moving in a downwardly direction towards the bottom of the vessel 24. The smaller size crystals move upwardly through zone A, as shown by the arrows in FIGURE 2, grow in the supersaturated liquor, become heavier, slow down, and eventually descend into zone B and continue to grow during their downward descent behind the baffle plate 26.

A predominant amount of medium size crystals in the upwardly deflected moving stream in zone A will grow to the larger size and settle out in the bottom of the vessel. In the same manner, a smaller amount of fine size crystals will grow to the medium size and a negligible amount of seed crystals to fine size crystals.

If desired, clear mother liquor from settling tank 36, described hereinafter, can be reintroduced to the bottom portion of vessel 24 via line 37 and line 34 containing normally open valve 35 whereby liquor entering the vessel 24 behind the deflector plate 26 slowly rises towards the overflow outlet line 32. Line 42 leading to slurry collecting tank 11 contains normally closed valve 41 and will be described hereinafter. The upward movement to the reintroduced mother liquor in zone B retards the downward movement of the crystals, giving them time to grow still larger.

The crystals grown in zone B are approximately the same size as the relatively coarse ones which pass under the baffle plate 26. However, to a minor extent, some relatively medium size and a small amount of relatively fine size crystals will settle out with the coarser size ones. The relatively coarse grown crystals at the bottom of the vessel are withdrawn as a slurry through line 29 as described before and are introduced to slurry settling tank 36 via line 30 containing normally open valves 38 and 40. Valve 39 of line 44 is normally closed. The overflow of liquor from vessel 24 is returned to the slurry collecting tank 11 through overflow line 32.

Figures 4, 5:
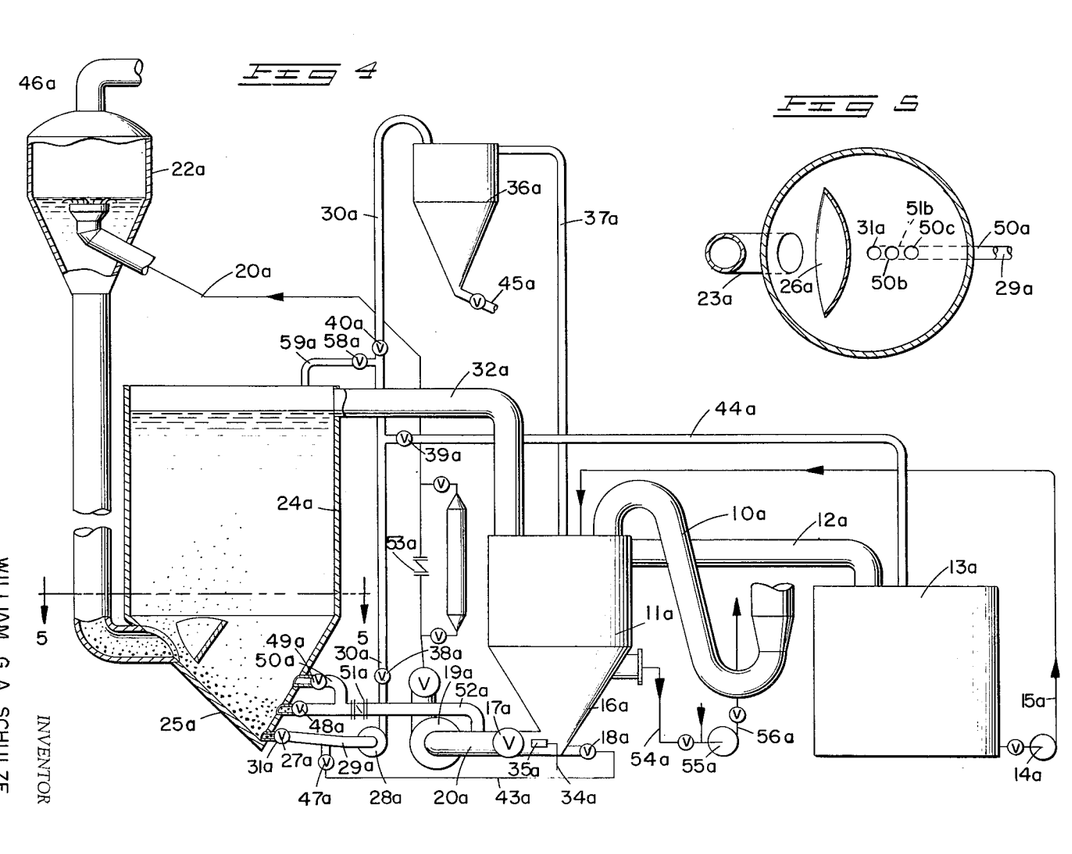
FIGURE 4 is a drawing indicating the various steps in the operation of a preferred process and apparatus for carrying out the invention.
FIGURE 5 is a sectional view of the classifying and crystallizing vessel shown in FIG. 4 when taken along line 5—5 thereof.

As noted in FIGURE 1, the vessel 24 can be straight sided as indicated in FIGURE 4 or have a somewhat pear-shaped form above the conical bottom 25 as shown in FIGURE 2. Constricting the upper part of the vessel speeds up the flow of the liquor a little in this part. By so doing, more seed size crystals are desirably carried out with the overflow and are recirculated eventually to the evaporator 22. The lower part of the vessel, being wider, provides more area behind the deflector plate for the grown coarser crystals to settle out.

The relatively coarse, uniform size, grown crystals of diammonium phosphate in the liquor slurry entering slurry tank 36 settle to the bottom and are withdrawn through valved line 45 and passed to a dryer for further processing. The overflow liquor from the slurry settling tank 36 overflows through line 37 and is returned to the crystallizing and classifying vessel 24 as described heretofore.

If it should be necessary to take the crystallizing and classifying vessel 24 out of the system and pump slurry directly from the slurry collecting tank 11 to the slurry settling tank 36, this may be accomplished by closing valves 17, 27, and 35 and opening valves 18, 47 and 41.

Valve 39 in line 44 remains closed at all times except when the contents of vessel 24 are to be pumped to mother liquor tank 13, then valves 27, 38 and 39 remain open, while valve 40 remains closed.

In a preferred embodiment of the invention and as indicated particularly in FIGURES 4 and 5, a saturated acid slurry liquor with crystals in suspension is introduced through line 10a and collects in a slurry-collecting tank 11a which contains a conical bottom 16a. Tank 11a is connected with a mother liquor tank 13a through overflow line 12a. Mother liquor tank 13a acts as a surge tank. If too much liquor is in the circulation system it can overflow into the mother liquor tank through line 12a. If the liquor level in the system needs replenishing this can be done by pumping surplus liquor from the mother liquor tank back into the slurry-collecting tank 11a by means of pump 14a through line 15a. The primary function of slurry collecting tank 11a is to concentrate by gravity settling the crystals from an absorber (not shown) in bottom 16a from where they are withdrawn with a substantial amount of liquor through line 20a, containing valve 17a, by means of a variable speed circulating pump 19a. This pump can be driven either by a stream turbine or a variable speed electric motor. Low pressure wet steam or hot water is also introduced into the suction end of pump 17a by diffusing nozzle 35a supplied by line 34a.

Another function of the slurry collecting tank 11a is to serve as a circulation tank for the spray system of an ammonia absorber (not shown) whereby spray liquor with some crystals in suspension is withdrawn through line 54a and pumped by means of pump 55a through line 56a to the absorber sprays (not shown). The outlet to line 54a from tank 11a is some distance above the bottom outlet to line 20a so as not to interfere too much with the settling of crystals in tank 11a. Slurry-collecting tank 11a is also in communication with classifying and crystallizing vessel 24a through overflow line 32a which returns overflow liquor from vessel 24a to the slurry-collecting tank 11a. Slurry-collecting tank 11a has an outlet line 43a containing normally closed valves 18a and 47a the function of which will be described more fully hereinafter.

The slurry liquor with the previously formed crystals in suspension is removed from tank 11a through line 20a and, if desired, can be passed through a heater 21a before introduction into the vacuum evaporator 22a for the purpose of achieving a better control of temperatures and optimum operating conditions. Suitable valves are provided for this purpose. In evaporator 22a the slurry liquor is concentrated by conventional means to a low supersaturation and in the metastable region and withdrawn through downleg 23a. Water vapor is removed from the evaporator 22a via line 46a which is connected to a conventional barometric condensor (not shown).

The supersaturated slurry liquor containing unclassified crystals is introduced into crystallizing and classifying vessel 24a from downleg 23a. Vessel 24a is provided a conical bottom 25a and the downleg 23a is connected to the upper portion of the conical bottom 25a of the vessel 24a. The supersaturated slurry liquor enters vessel 24a as a substantially horizontal stream and is diverted upwardly as shown by the arrows leading from inclined deflector or baffle plate 26a in the same fashion as indicated previously in connection with the discussion of vessel 24 of FIGURES 1-3.

The supersaturated slurry liquor in the metastable region slowly loses its supersaturation as it passes through downleg 23a enters tank or vessel 24a and then passes upwardly toward the outlet to line 32a. The more the crystals grow the less supersaturated the slurry liquor becomes and as the liquor leaves tank 24a through line 32a it is generally in only a saturated condition.

Crystals of diammonium phosphate contained within the entering supersaturated slurry liquor stream can be efficiently classified by this operation. The relatively coarser and heavier crystals in the slurry liquor descend and pass beneath the deflector plate 26a flowing down the conical surface of the bottom portion of the tank until they accumulate at the bottom. The minor amount of liquor passing below baffle plate 26a gently agitates the settling crystals behind the baffle plate 26a to keep them from packing.

The heaviest and largest of the coarse crystals are withdrawn through outlet 31a into slurry outlet line 29a containing slurry pump 28a and valve 27a. Simultaneously the medium to large coarse crystals still in suspension above the heaviest and largest cyrstals are withdrawn, before they have an opportunity to settle, with some of the slurry liquor through a selected lower or upper opening 50b and 50c respectively of line 52a to the inlet side of pump 19a. Due to a considerably higher liquid level in the crystallizing and classifying vessel 24a than in the slurry collecting tank 11a the necessary gravity pressure for free flow is created. Line 52a having approximately 4 times the capacity of line 29a will allow the medium to large crystals to make several passes through the evaporator system with valve 51a in line 52a wide open to attain maximum growth before final removal takes place through outlet or opening 31a. If extra large size cyrstals are not desired gradual closing of valve 51a will restrict the recirculation and consequently the growth rate until the desired size has been attained. Valve 51a can then be left at the desired setting to maintain production of uniform selected size crystals. For regular continuous production valve 48a in the line 51b connecting outlet 50b with line 52a is opened while valve 49a in the line 50a connecting outlet 50c with line 52a is closed. Should operations be slowed down and batch removal of crystals be desirable, valve 48a is closed and valve 49a opened. Then crystals can build up to the level of line 50a and be removed at intervals through opening 31a. While the larger crystals pass through the opening below baffle plate 26a, the relatively smaller crystals of diammonium phosphate contained in the entering slurry liquor stream being lighter are carried along with the supersaturated liquor stream and are diverted upwardly towards the overflow liquor outlet line 32a.

It is to be noted that the deflector plate 26 which diverts the liquor stream upwardly, the configuration of the vessel bottom 25a and the overflow liquor outlet line 32a, positoned at the opposite end of the vessel with respect to the slurry liquor stream inlet, create two zones, $A^1$ and $B^1$, within the vessel. The approximate merging line of these zones between the deflector plate 26a and overflowing liquor outlet line 32a is indicated by the dash line 33a in FIGURE 6 of the drawings. The two zones comprise two moving suspensions of crystals. In zone $A^1$, relatively smaller crystals, comprising fine and medium sizes, move in an upwardly direction, while in zone $B^1$, a suspension of growing relatively coarser and larger crystals move in a downwardly direction towards the bottom of the vessel 24a. The smaller size crystals move upwardly through zone $A^1$, as shown by the arrows, grow in the supersaturated slurry liquor, become heavier, slow down, and eventually descend into zone $B^1$ and continue to grow during their downward descent behind the baffle plate 26a.

Figure 6:
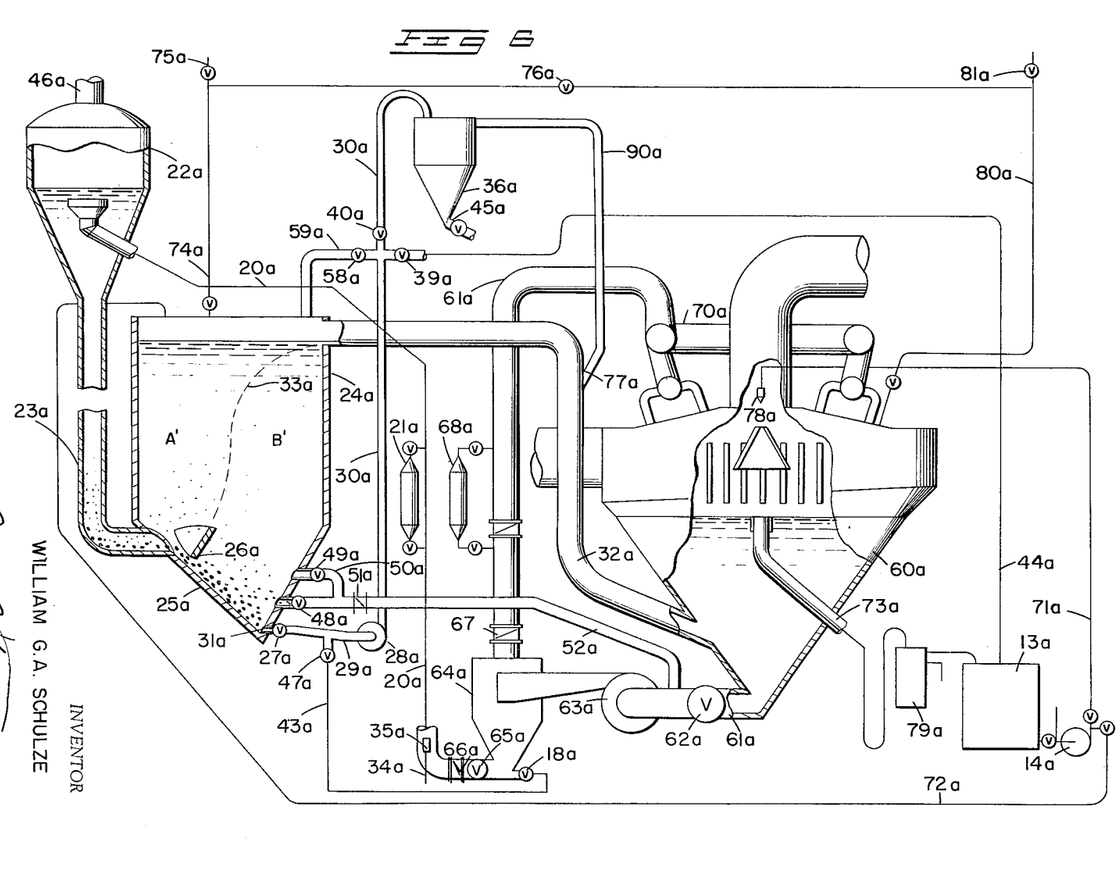
FIGURE 6 is a drawing indicating the various steps in the operation of a process and apparatus that may be used to carry out the instant invention in connection with an ammonia absorber unit such as that disclosed in my copending application, Serial Number 811,326 filed May 6, 1959.

A predominant amount of medium size crystals in the upwardly deflected moving stream in zone $A^1$ will grow to the larger size and settle out in the bottom of the vessel. In the same manner, a smaller amount of fine size crystals will grow to the medium size and a negligible amount of seed crystals to fine size crystals. The crystals settling in zone $B^1$ join the crystals which initially passed below baffle 26a in the bottom of the crystallizing and classifying vessel. Here they are subjected to the previously described controlled recirculation by which they will attain the desired mature size.

The mature coarse grown crystals at the bottom of the vessel are withdrawn as a slurry through line 29a as described before and are introduced to slurry settling tank 36a via line 30a containing normally open valves 38a and 40a. Valves 39a of line 44a is normally closed. The overflow of liquor from vessel 24a is returned to the slurry collecting tank 11a through overflow line 32a.

Valve 58a in line 59a is normally closed. It is only open during the starting up period after a shutdown. At that time the crystals from bottom outlet 31a can be circulated back into vessel 24a with valves 27a, 38a and 58a being open while valves 39a and 40a are closed until normal operating conditions and the desired crystal size have been obtained. This prevents initially small crystals from getting into the slurry settling tank 36a where they would mix with mature crystals which is undersirable.

The relatively coarse, uniform size, mature crystals of diammonium phosphate in the slurry liquor entering slurry tank 36a settle to the bottom and are withdrawn through valved line 45a and passed to a dryer for further processing. The overflow liquor from the slurry settling tank 36a overflows through line 37a and is returned to the slurry collecting tank 11a.

If it should be necessary to take the crystallizing and classifying vessel 24a out of operation and pump slurry liquor directly from the slurry collecting tank 11a to the slurry settling tank 36a, this may be accomplished by closing valves 17a, 27a, 39a and 58a and opening valves 18a, 47a, 38a and 40a.

Valve 39a in line 44a remains closed at all times except when the contents of vessel 24a are to be pumped to mother liquor tank 13a, then valves 27a, 38a and 39a remain open, while valves 40a and 58a remain closed. Slurry liquor from tank 11a may also be subjected to heat in the manner previously described prior to its introduction into evaporator 22a by passing it through heater 21a at which time of course valve 53a in line 20a would be closed.

In FIGURE 5, a cross-section of vessel 24a is shown. The top view of baffle 26a indicates its general shape. The bottom edge of baffle 26a is located a suitable distance away from the inside of the cone for its entire length to provide ample passage below for large crystals.

FIGURE 6 shows an advantageous use for the instant apparatus with the ammonia absorber unit disclosed in my copending U.S. application, Serial Number 811,326 filed May 6, 1959.

In this instance the saturated acid slurry liquor which contains diammonium phosphate crystals of predominantly smaller sizes in suspension or primary crystals and diammonium phosphate in solution is obtained from the ammonia absorber 60a in which complete saturation and crystallization have taken place and slurry settling tank 11a is replaced by a suitable crystal separator 64a. The saturated acid slurry liquor with crystals in suspension is drawn through line 61a containing valve 62a to a variable speed steam turbine driven pump 63a which discharges the slurry liquor containing the crystals into a suitable centrifugal liquid-solid separator 64a at a desired rate. Here the liquor is separated into two portions, the major portion from which the crystals have been removed passes out of the top center of separator 64a at a rate of approximately two thirds of total volume through line 69a to spray header 70a which supplies liquor to the spray nozzles (not shown) for absorber 60a. If desired all or part of the liquor passing through line 69a may be bypassed through the heater 68a before it returns to the absorber.

The smaller portion of the slurry liquor containing substantially all of the primary crystals passes out of the conical bottom of separator 64a through line 20a containing valve 65a and regulating butterfly valve 66a to evaporator 22a at a predetermined rate such as approximately one third of the total volume pumped by pump 63a. Discharge pressure from bottom of separator 64a which is normally from 10 to 15 p.s.i. plus the vacuum in the evaporator provide sufficient flow rate to the evaporator making an additional pump unnecessary. Low pressure wet exhaust steam which may be obtained from turbine driven pump 62a or hot water is introduced into line 20a directly after regulating valve 66a by diffusing nozzle 35a supplied by line 34a to dissolve seed crystals.

The liquor with the previously formed crystals in suspension discharged from the bottom of separator 64a through line 20a may, if desired, be passed all or partly through a heater 21a before introduction into vacuum evaporator 22a for the purpose of achieving a better control of temperatures and optimum operating conditions.

Suitable valves are provided in the heater lines leading to line 20a for this purpose.

The steps carried out in evaporator 22a, downleg 23a, crystallizing and classifying vessel 24a containing baffle 26a and the manner by which crystals are classified and withdrawn through line 52a to be recirculated by circulating pump 63a and finally removed through line 29a are similar to those previously described with reference to FIGURE 4 of the drawings. The controlled crystal recirculation is fundamentally not changed, except that the recirculated crystals passing through line 52a as shown in FIGURE 6 to the inlet of pump 63a are separated along with the original crystals from the absorber 60a in separator 64a and pass from separator 64a through line 20a to evaporator 22a for further growth.

Overflow line 32a from vessel 24a enters absorber 60a below the liquid level. This allows liquor to rise in line 32a due to the normal higher gas pressure in the absorber over atmospheric pressure and form a seal. The overflow outlet from vesssel 24a to line 32a is at a sufficiently higher elevation than the liquid seal level in the vertical part of line 32a to provide an unobstructed overflow outlet 77a for liquor from slurry settling tank 36a through line 90a and to allow for some variation in the liquid seal level due to changing gas pressures in the absorber.

Mother liquor tank 13a serves as a surge tank in a conventional secondary recirculation system whereby acid liquor with addition of fresh make up acid at the pump inlet is drawn from the bottom of mother liquor tank 13a to pump 14a and pumped through line 71a to center spray 78a. A portion of liquor with floating tar overflows into sealed line 73a and passes to tar trap 79a where the tar is removed. The clear liquor then returns from the tar trap to mother liquor tank 13a to repeat the cycle. Line 72a is used to fill vessel 24a with liquor from the mother liquor tank at the start of operation.

Lines 74a and 80a are vent lines for vessel 24a and absorber 60a respectively. Should it be desirable to construct vessel 24a as a pressure vessel and have the space above the liquid level under gas pressure this pressure can be maintained from the absorber by opening valve 76a while suitable valves in lines 75a and 81a are closed. In this case line 90a would then have to be constructed to have its outlet into absorber 60a below the liquid level to be properly sealed.

The invention provides for optimum operating conditions for maximum crystal growth at any given production level. In order to obtain optimum conditions, the flow rates to the evaporator should be variable and the temperature of the liquor should be carefully controlled. In the process and apparatus of this invention, the optimum operating conditions can be attained with no more power requirements than absolutely necessary, by regulating the amount of steam for the proper speed of the variable speed pump 19a or 63a which are preferably of the steam turbine driven type, working against 15 p.s.i. back pressure steam, and using the exact amount of steam necessary in heater 21a. The exhaust steam of the steam turbine which is kept at approximately 15 pounds is used efficiently to heat liquor heater 21a and/or 68a and to supply wet low pressure steam through lines 34a to diffusing nozzle 35a for seed crystal elimination. By being able to control operations to such a degree, no power is wasted and only the necessary minimum is used. Other crystallizing systems usually use a standard flow rate with the same power requirements for all conditions.

The following is a typical example of the operation of a preferred procedure according to the method of the instant invention as carried out by a preferred apparatus such as that shown in FIGURE 6.

*Example*

A saturated slurry liquor containing diammonium phosphate crystals was fed at a total liquor circulation rate of 3300 gallons a minute to evaporator 22a. The 3300 gallons a minute was made up of 500 gallons a minute drawn from the slurry collecting tank 16a through line 20a, etc., and 2800 gallons a minute of recycled liquor drawn from the crystallizing-vessel 24a through line 52a and fed into line 20a. The temperature of the slurry liquor as it entered evaporator 22a from line 20a was on the order of 51° C. The temperature of the liquor as it left evaporator 22a through line 23a was on the order of 46° C. As the slurry liquor passed through evaporator 22a a vacuum on the order of 27" of mercury was maintained. The slurry liquor as it left the evaporator 22a contained chemically bound $NH_3$ in the amount of 12.8% by weight of the total weight of the slurry liquor calculated at 50° C. The solubility of the crystals in the liquor at 50° C. was 150 gms./100 gms. $H_2O$ and the liquor had a specific gravity of 1.346, a viscosity of 9.0 cp., a mol ratio $NH_3/H_3PO_4$ of 1.6, a pH of 6.25 and a boiling point elevation of 4° C. The production rate of relative coarse uniform size diammonium phosphate crystals produced under the above set of conditions was on the order of 6,000 pounds per hour.

Screen tests of this diammonium phosphate production at different open settings of the 8" butterfly valve 51a in recirculating line 52a and with valve 48a being open and valve 49a being closed, was as follows:

| Valve opening | ¼ | | ½ | | ¾ | | Valve open full | |
|---|---|---|---|---|---|---|---|---|
| | Wt. percent | Cum. wt. percent | Wt. percent | Cum. wt. percent | Wt. percent | Cum. wt. percent | Wt. percent | Cum. wt. percent |
| +10 mesh | .1 | .1 | .2 | .2 | .6 | .6 | 6.3 | 6.3 |
| +20 mesh | 75.6 | 75.7 | 83.2 | 83.4 | 91.0 | 91.6 | 87.4 | 93.7 |
| +35 mesh | 23.3 | 99.0 | 16.5 | 99.9 | 8.35 | 99.95 | 6.2 | 99.95 |
| +65 mesh | 1.0 | 100.0 | .1 | 100.0 | .05 | 100.0 | .05 | 100.0 |

The above example shows that excellent production rates of a high quaity product are obtained by this invention and the table further shows that coarse, mature crystals of substantially uniform size ranges are obtained by suitable operation of the apparatus of the invention.

The "metastable range" referred to in the specification and claims is, of course, to be understood as referring to the solution of the slurry liquor.

It will be obvious to those skilled in the art that various modifications may be made in the form of the invention herein disclosed and described without departing from the principles thereof, and it will be understood that the invention is not to be limited, excepting by the scope of the appended claims.

What is claimed is:

1. A process for the production of diammonium phosphate crystals of relatively coarse, uniform size from a saturated slurry liquor containing diammonium phosphate in solution and relatively smaller size diammonium phosphate crystals, comprising continuously introducing said slurry into an evaporation zone, concentrating the slurry therein to supersaturation, continuously withdrawing a stream of supersaturated slurry liquor containing relatively coarse and relatively smaller crystals from said evaporation zone and continuously introducing said withdrawn stream into the lower portion of a crystallizing and classifying vessel, partitioning said introduced stream of liquor such that a portion thereof carrying said smaller crystals is deflected upwardly away from the point of introduction of said stream toward the opposed upper portion of said vessel and another portion of aid stream carrying said relatively coarse crystals gravitates downwardly to the bottom of the vessel, overflowing desupersaturated liquor from said upper opposite portion of said vessel, creating by said partitioning and maintaining two adjacent intercommunicating zones of flow within said vessel, the first of said zones comprising said upwardly deflected portion of said stream containing said smaller size crystals of diammonium phosphate flowing towards said upper opposite portion of said vessel, the second of said zones including a gentle upwardly moving stream of saturated liquor introduced near the bottom of said vessel, whereby smaller size crystals moving upwardly through said first zone, grow, become heavier, slow down and pass over into said second zone wherein said crystals continue to grow during their downward movement into said bottom of said vessel, and withdrawing a slurry of relatively coarse, uniform size, diammonium phosphate crystals from the said bottom of said vessel.

2. Apparatus for growing and uniformly classifying crystals in a saturated liquor, comprising a vertical elongated vessel, the lower end of said vessel having downwardly converging wall portions, a feed inlet in communication with the lower portion of said vessel for feeding supersaturated liquor and suspended crystals as a substantially horizontal stream towards the center of said vessel, an outlet means in communication with the top portion of said vessel and opposite from said feed inlet for overflowing desupersaturated liquor from said vessel, baffle means disposed within said vessel adjacent to and inclined away from said feed inlet in a direction generally transverse to the normal axis of said feed inlet for partitioning said entering stream and for diverting upwardly a portion thereof carrying in suspension the relatively smaller crystals while at the same time causing the remainder of said stream carrying said relatively coarse crystals to pass underneath and to gravitate into the bottom portion of said vessel, an outlet means in communication with said vessel at the bottom for withdrawing a slurry of said relatively coarse crystals from said vessel, inlet liquor conduit means in the lower portion of said vessel and opposite to said feed inlet for introducing desupersaturated liquor behind said baffle means, the arrangement of said baffle means, said downwardly converging wall portions of the lower end of said vessel, and said overflow outlet means creating two contiguous flow zones within said vessel whereby relatively smaller crystals entering said vessel are carried upwardly in a first zone toward said overflow outlet means, grow, become heavier, slow down, and move into a second zone wherein the crystals continue to grow as they descend to the bottom of said vessel.

3. Apparatus for growing and uniformly classifying crystals in a diammonium phosphate slurry liquor containing relatively coarse uniform size and relatively smaller crystals of diammonium phosphate, comprising: a slurry collecting vessel provided with inlet means for collecting a slurry of diammonium phosphate liquor and crystals of diammonium phosphate, overflow means for said slurry collecting vessel communicating with a mother liquor vessel, and outlet means from said slurry collecting vessel including variable speed pump means for withdrawing a crystal slurry therefrom; an evaporator provided with inlet means communicating with said slurry collecting vessel outlet means, and a downleg outlet for said evaporation; a crystallizing and classifying vessel provided with slurry inlet means communicating with the downleg outlet of said evaporator and an overflow outlet communicating with said slurry collecting vessel, baffle means disposed within said crystallizing and classifying vessel and at an angle with respect to the normal axis of said slurry inlet means for partitioning the slurry liquor entering the vessel into an upwardly diverted portion which contains smaller size crystals in suspension and moves towards the overflow outlet of the vessel and a downwardly gravitating portion which contains the relatively coarse uniform size crystals and moves towards the bottom of the vessel, the baffle means also being supported by and in spaced relationship to a wall of the vessel such that the downwardly gravitating portion of the stream containing the relatively coarse uniform size crystals can pass beneath the baffle means and into the bottom of the vessel, slurry outlet means at the bottom of said vessel for withdrawing a slurry of grown coarse diammonium phosphate crystals therefrom; and a slurry settling vessel provided with inlet means communicating with said slurry outlet means of said crystallizing and classifying vessel, an overflow outlet means for returning overflow liquor from said slurry settling vessel to the bottom portion of said crystallizing and classifying vessel, and outlet means for withdrawing coarse uniform size diammonium phosphate crystals.

4. The apparatus of claim 3 wherein said outlet means for withdrawing said crystal slurry from said slurry collecting vessel includes heating means for heating said crystal slurry before introduction into said evaporator.

5. In a crystallizing and classifying process wherein a slurry liquor stream containing primary crystals in suspension is passed through an evaporation zone to produce supersaturation of said slurry liquor stream prior to its introduction into a crystallizing and classifying zone, the steps of introducing a heated aqueous fluid into said slurry liquor stream prior to passing the slurry liquor stream through said evaporation zone so as to dissolve seed crystal nuclei contained therein and retard the formation of additional crystals nuclei therein, and while passing said slurry liquor stream through said evaporation zone maintaining the supersaturated condition of the slurry liquor within a metastable region, then introducing the supersaturated slurry liquor stream containing crystals of diverse sizes laterally into the lower portion of a crystallizing and classifying zone, partitioning said stream with a portion thereof carrying the crystals of lesser size being deflected upwardly in said last mentioned zone and away from the point of introduction of said stream and with the remainder of said stream carrying the crystals of larger size being directed downwardly to the bottom of the crystallizing and classifying zone, the smaller crystals being suspended in the upwardly deflected stream, such that they grow, become heavier, and move out of the upwardly deflected stream and while continuing to grow finally descend through a contiguous part of the crystallizing and classifying zone toward the bottom of said last mentioned zone and retarding the descent of the crystals through said contiguous part of the crystallizing and classifying zone by effecting a gentle upward movement of that portion of the partitioned slurry liquor stream generally directed into the bottom of the crystallizing and classifying zone.

6. In a continuous crystallizing and classifying process wherein a slurry liquor stream containing primary crystals of diverse sizes in suspension is passed through an evaporation zone to produce supersaturation of the slurry liquor prior to its introduction into a crystallizing and classifying zone, the steps of introducing the supersaturated slurry liquor stream containing crystals of diverse sizes laterally into the lower portion of the crystallizing and classifying zone, partitioning said stream with a portion thereof carrying the crystals of lesser size being deflected upwardly in the crystallizing and classifying zone and away from the point of introduction of said stream, and with the remainder of said stream carrying the crystals of larger size being directed downwardly to the bottom of the crystallizing and classifying zone, the smaller crystals being suspended in the upwardly deflected stream, whereby they grow, become heavier, move out of said upwardly deflected stream and while continuing to grow finally descend through a contiguous part of the crystallizing and classifying zone to the bottom of said last mentioned zone and retarding the descent of the crystals through said contiguous part of the crystallizing and classifying zone by effecting a gently upward movement of that portion of the partitioned slurry liquor stream generally directed into the bottom of the crystallizing and classifying zone, withdrawing a slurry containing the relatively coarse uniform size crystals from the bottom of said crystallizing and classifying zone, withdrawing slurry containing medium to large size crystals from said crystallizing and classifying zone at a point above the level of withdrawal of the coarse uniform size crystals and introducing said slurry containing medium to large size crystals into the slurry liquor stream containing primary crystals in suspension prior to the passage of said slurry liquor stream to said evaporation zone.

7. Apparatus for growing and uniformly classifying crystals in a saturated slurry liquor comprising in combination an evaporator and a crystallizing and classifying vessel, said evaporator having a slurry liquor inlet and outlet means, the lower portion of said vessel being provided with downwardly converging wall portions and a plurality of slurry liquor outlets, a liquor inlet means for said vessel communicating with the said lower portion thereof and a liquor overflow outlet means for said vessel disposed above and opposite to said liquor inlet means, baffle means located within said vessel to partition said slurry liquor introduced through said inlet means and to effect an initial classification of the crystals contained in said liquor, said baffle means being supported in spaced relationship to a converging wall portion of said vessel while also being disposed adjacent to and inclined away from the liquor inlet means for the vessel and in a plane generally transverse to the normal axis of said liquor inlet means, conduit means connecting the outlet means of the evaporator with the inlet means of the vessel, and conduit means connecting at least one of the slurry liquor outlets in the lower portion of the vessel with the liquor inlet mean for the evaporator.

8. Apparatus for growing and uniformly classifying crystals in a saturated slurry liquor as set forth in claim 7 wherein the plurality of slurry liquor outlets in the lower portion of the vessel comprises an outlet for a part of the slurry liquor containing relatively coarse, mature crystals, and a pair of vertically spaced outlets disposed above said first mentioned outlet and through which slurry containing medium and large size crystals can be selectively withdrawn and passed into said last mentioned conduit means, and valve means for selectively opening said slurry liquor outlets.

9. Apparatus for growing and uniformly classifying crystals in a saturated slurry liquor comprising in combination a supply means for slurry liquor containing primary crystals, an evaporator and a crystallizing and classifying vessel, said evaporator having slurry liquor inlet and outlet means and the lower portion of said vessel having downwardly converging wall portions provided with a plurality of slurry outlets, a liquor inlet means for said vessel communicating with the said lower portion thereof, and a liquor overflow outlet means for said vessel disposed above and opposite to the liquor inlet means of the vessel, baffle means located within said vessel to partition said slurry liquor introduced through said inlet means and to effect an initial classification of the crystals contained in said liquor, said baffle means being supported in spaced relationship to a converging wall portion in the bottom of the vessel while also being disposed adjacent to and inclined away from the liquor inlet means for the vessel and in a plane generally transverse to the normal axis of said liquor inlet means, conduit means connecting the liquor outlet means of the evaporator with the liquor inlet means of the vessel and conduit means connecting at least one of the outlets in the converging wall portions of the vessel with the liquor inlet means for the evaporator.

10. A crystallizing and classifying unit for use with an evaporator, said unit comprising an elongated vessel having downwardly converging wall portions in the lower part thereof, a slurry liquor inlet extending horizontally into the said wall portions of the vessel and communicating with the evaporator, a liquor overflow outlet at the top of said vessel and a baffle disposed adjacent the said slurry liquor inlet and inclined away from said slurry liquor inlet, said baffle lying in a plane generally transverse to the normal axis of said slurry liquor inlet and spaced therefrom to partition said slurry liquor introduced through said inlet and to effect an initial classification of the crystals contained in said liquor, and said vessel being further provided with a plurality of slurry liquor outlets in the bottom of said vessel, one of said outlets being usable for withdrawing relatively coarse mature crystals and others of said outlets being usable for withdrawing medium to large size crystals from the vessel and for accelerating crystal growth by recirculation through the evaporator and then back to said vessel.

11. A crystallizing and classifying process which comprises introducing a stream of supersaturated liquor containing relatively coarse and relatively smaller crystals laterally into the lower portion of a vessel, partitioning said introduced stream such that a portion thereof carrying said smaller crystas is deflected upwardly away from the point of introduction of said stream and toward the opposed upper portion of said vessel and another portion of said stream carrying said relatively coarse crystals is allowed to gravitate downwardly to the bottom of said vessel, creating and maintaining within said vessel contiguous substantially vertical zones of material movement, one of said zones comprising the deflected portion of the introduced stream of supersaturated liquor together with the relatively smaller crystals suspended therein, the other of said zones comprising another upwardly directed, slowly moving stream of liquor and a downwardly gently moving suspension of crystals made up of the smaller crystals which had initially moved upwardly through said first zone and then slowed down as they grew and became heavier and then entered the other of said zones, the crystals in said downwardly moving suspension of crystals growing until their size approximates that of the relatively coarse crystals, collecting the crystals in said downwardly moving suspension of crystals in the bottom of said vessel along with said relatively coarse crystals separated from the originally introduced stream of liquor, and withdrawing a slurry containing relatively coarse crystals of uniform size from the bottom of said vessel.

12. The process of claim 11 wherein the liquor level in the vessel is maintained by withdrawing desupersaturated liquor from the upper portion of said vessel and the second of said contiguous zones has induced therein a gentle upward liquor movement by introducing a portion of said withdrawn desupersaturated liquor into the base of said second zone, said gentle upward movement of liquor retarding the downward movement of the crystals therethrough to afford additional continuing growth thereof.

13. A process for the production of diammonium phosphate crystals of relatively uniform size from a supersaturated diammonium phosphate liquor containing crystals of relatively coarse and reltaively smaller size, which comprises continuously introducing a stream of said supersaturated liquor laterally into the lower portion of a crystallizing and classifying vessel containing an aqueous solution of diammonium phosphate, partitioning said introduced stream of liquor such that a portion thereof carrying said smaller crystals is deflected upwardly away from the point of introduction of said stream and toward the opposed upper portion of said vessel and another portion of said stream carrying said relatively coarse crystals gravitates downwardly to the bottom of said vessel, creating by said partitioning and thereafter maintaining within said vessel contiguous substantially vertical zones of material movement, one of said zones comprising the deflected portion of the introduced stream of supersaturated liquor together with the relatively smaller diammonium phosphate crystals suspended therein, the other of said zones comprising another upwardly directed, slowly moving stream of liquor and downwardly moving diammonium phosphate crystals the weight of which latter crystals has increased by allowing said latter crystals to continue their growth in said moving liquor until the buoyancy of the last mentioned stream of moving liquor has been overcome and the crystal size of said latter crystals approximates that of the relatively coarse crystals initially admixed therewith, collecting said downwardly moving crystals in the other of said zones in the bottom of said vessel along with said relatively coarse crystals separated from the originally introduced stream of liquor, and withdrawing a slurry containing relatively coarse diammonium phosphate crystals of uniform size from the bottom of said vessel.

References Cited by the Examiner

UNITED STATES PATENTS

| | | | |
|---|---|---|---|
| 1,873,251 | 8/32 | Allen | 23—303 |
| 2,066,577 | 1/37 | Ritchie et al. | 23—273 |
| 2,088,601 | 8/37 | Kermer | 23—273 |
| 2,567,968 | 9/51 | Saeman | 23—273 |
| 2,614,035 | 10/52 | Robinson | 23—302 |
| 2,737,451 | 3/56 | Saeman | 23—302 |
| 2,801,907 | 8/57 | Scott | 23—301 |
| 2,808,103 | 10/57 | Cook | 23—273 |
| 2,819,154 | 1/58 | Frejacques | 23—301 |
| 2,827,366 | 3/58 | Saema | 23—273 |

FOREIGN PATENTS 415,899   9/34   Great Britain.

OTHER REFERENCES

Ser. No. 414,040, Isaachsen (A.P.C.), published June 1, 1943.

NORMAN YUDKOFF, *Primary Examiner.*

GEORGE MITCHELL, MAURICE A. BRINDISI, *Examiners.*